US005750024A

United States Patent [19]
Spearman

[11] Patent Number: 5,750,024
[45] Date of Patent: May 12, 1998

[54] CONICAL COALESCING FILTER

[75] Inventor: Michael R. Spearman, St. Paul, Minn.

[73] Assignee: Porous Media Corporation, St. Paul, Minn.

[21] Appl. No.: 414,273

[22] Filed: Mar. 31, 1995

Related U.S. Application Data

[63] Continuation of Ser. No. 952,611, Nov. 12, 1992, Pat. No. 5,454,945.

[51] Int. Cl.⁶ .......................... B01D 27/08; B01D 39/06; B01D 39/20
[52] U.S. Cl. .......................... 210/315; 210/317; 210/489; 210/497.01; 210/497.1; 210/497.3; 210/DIG. 5; 96/188; 96/189
[58] Field of Search .................. 210/317, 315, 210/318, 337, 338, 497.01, 497.3, 493.1, DIG. 5, 488, 489; 96/188, 189

[56] References Cited

U.S. PATENT DOCUMENTS

| | | |
|---|---|---|
| 2,823,760 | 2/1958 | Andersen . |
| 2,864,505 | 12/1958 | Kasten ........................ 210/315 |
| 3,708,965 | 1/1973 | Domnick ...................... 55/488 |
| 3,802,160 | 4/1974 | Foltz ........................... 210/457 |
| 3,893,925 | 7/1975 | Jones .......................... 210/266 |
| 4,006,054 | 2/1977 | Head . |
| 4,038,194 | 7/1977 | Luceyk et al. ............... 210/488 |
| 4,052,316 | 10/1977 | Berger, Jr. et al. .......... 210/315 |
| 4,053,414 | 10/1977 | In't Veld ..................... 210/117 |
| 4,102,785 | 7/1978 | Head et al. .................. 55/487 |
| 4,157,968 | 6/1979 | Kronsbein ................... 210/489 |
| 4,231,768 | 11/1980 | Seibert et al. ............... 55/179 |
| 4,309,289 | 1/1982 | Head ........................... 210/488 |
| 4,330,306 | 5/1982 | Salant ......................... 55/473 |
| 4,376,675 | 3/1983 | Perrota ........................ 55/527 |
| 4,661,227 | 4/1987 | Reeder et al. ............... 204/186 |
| 4,836,931 | 6/1989 | Spearman et al. .......... 210/484 |
| 4,844,795 | 7/1989 | Halwani ...................... 210/98 |
| 4,892,667 | 1/1990 | Parker, III et al. .......... 210/315 |
| 5,450,835 | 9/1995 | Wagner ....................... 123/573 |

FOREIGN PATENT DOCUMENTS 115440  1/1984  Poland .

*Primary Examiner*—W. L. Walker
*Attorney, Agent, or Firm*—Marshall & Melhorn

[57] ABSTRACT

A porous coalescing filter element of conical configuration is disposed within a substantially cylindrical filter housing such that the area between the element and the wall increases in the direction of the primary phase flow to keep the annular velocity substantially constant or decreasing in the direction of primary fluid flow. The element may be manufactured with a round end and tapered walls terminating to a pointed apex, but is more preferably manufactured and secured within the filter housing using flat end caps on both ends. The filter element may be vacuum formed, or manufactured from media in a flat sheet form, which may be pleated if desired.

55 Claims, 2 Drawing Sheets

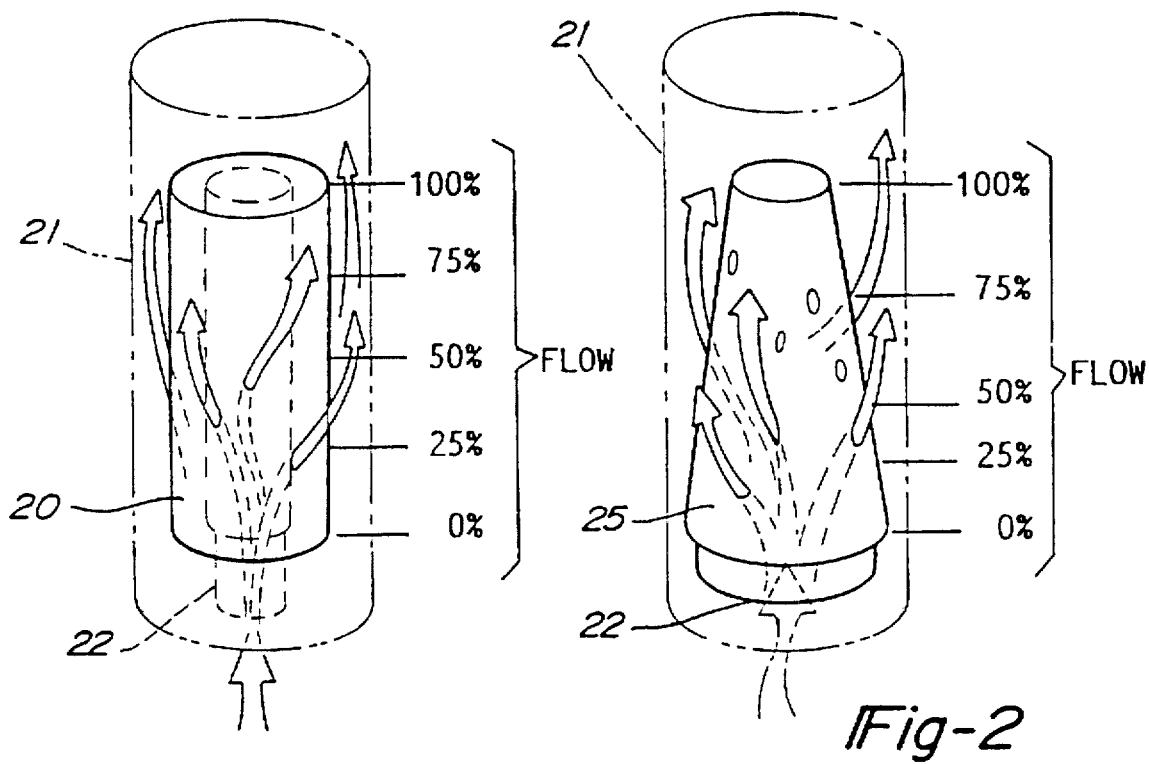
Fig-1
PRIOR ART
Fig-2
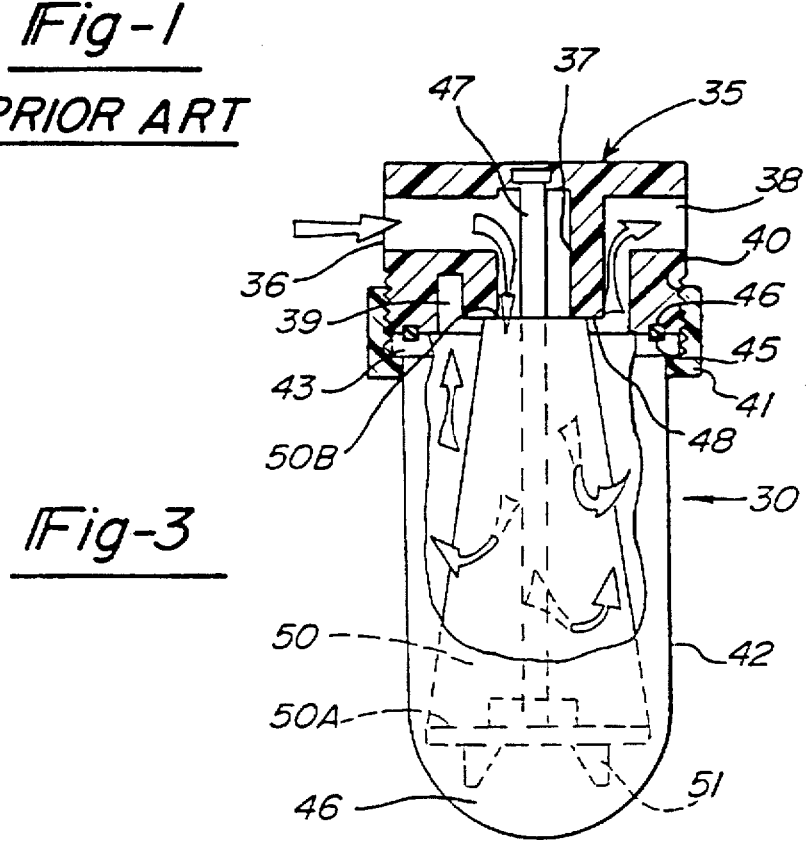
Fig-3

CONICAL COALESCING FILTER

This application is a continuation of application Ser. No. 07/952,611, filed Nov. 12, 1992, now U.S. Pat. No. 5,454,945.

BACKGROUND OF THE INVENTION

1. Field of the Invention

The present invention relates to the coalescing art, and specifically to an improved coalescing filter element which may be used in virtually any coalescing filter assembly. More particularly, the invention relates to a coalescing filter element used in separating liquid droplets from gases or other liquids, and having a conical configuration. The conical configuration allows for lower velocity of the primary phase fluid in the area between the outside surface of the coalescing element or elements and the filter assembly inner wall, thereby reducing the maximum droplet diameter which may be supported by or reentrained in the primary phase fluid. This allows for more efficient separation of the coalesced droplets from the primary phase fluid. It also allows for lower pressure drop through the coalescing filter elements.

2. Description of the Prior Art

The need to separate liquid droplets from gases or other liquids is long standing in the art. Common liquids found in air and gas streams include lube oils, water, salt water, acids, caustics, hydrocarbons, completion fluids, glycol and amine. The liquid normally is present in the form of tiny droplets, or aerosols. The size distribution of the aerosols is primarily dependent on the surface tension of the liquid contaminant and the process from which they are generated. As the surface tension is reduced, the size of the aerosol is reduced accordingly. This is because the intermolecular cohesive forces (the forces which attract the surface molecules of an aerosol inward in order to minimize surface area with respect to volume) are weaker.

It has been found that greater than 50% of all oil aerosols by weight are less than 1 micrometer in diameter. Due to their similar surface tensions, the same holds true for glycols, amines and hydrocarbons. Conventional filtration/separation equipment such as settling chambers, wire mesh (impingement) separators, centrifugal or vane (mechanical) separators and coarse glass or cellulose filters are only marginally efficient at 1 micrometer, and remove virtually none of the prevalent sub-micrometer aerosols and particles. In order to remove these problem-causing contaminants, high efficiency coalescing filters must be used.

All previous coalescing filters and coalescing elements of the type with which the present invention is concerned are configured in a tubular or cylindrical arrangement, and used to flow in to out or, from out to in. While it is advantageous to flow from out to in for many filter applications, there is also a definite advantage for flowing in to out for the coalescing of liquid droplets and aerosols from gases, or the coalescing of two immiscible liquid phases.

In these applications, it is common to use coalescing elements secured within a pressure-containing vessel or housing to form a coalescing filter assembly. The continuous phase gas or liquid contains dispersed liquid aerosol droplets, sometimes referred to as the discontinuous phase. The mixture enters the assembly through an inlet connection and then flows to the inside of the coalescing element. As the fluid flows through the filter media of the coalescing element, the liquid droplets come in contact with the fibers in the media and are removed from the fluid stream. Within the media, the droplets coalesce with other droplets and grow to emerge as large droplets on the downstream surface of the element which are capable of being gravitationally separated from the continuous phase fluid. If the density of the droplets is greater than that of the fluid, such as oil droplets in air, the droplets will settle gravitationally to the bottom of the filter assembly, countercurrent to the upward flow of air. If the density of the droplets is less than that of the fluid, such as oil droplets in water, the droplets will rise to the top of the assembly countercurrent to the downward flow of the water.

The droplet size, droplet density, fluid viscosity, and fluid density will determine how rapidly the droplet settles or rises in the filter assembly. It is advantageous in designing coalescing filter assemblies to try to maximize the flow rate of the fluid through the assembly while not reducing separation efficiencies in order to reduce the size of the housing required for a given flow rate, and thereby reduce the manufacturing costs.

However, the cylindrical coalescing elements of the prior art impose substantial limiting factors in designing filter housings. The cylindrical configuration of the coalescing elements provides a fixed annular space between the element and the housing wall. Therefore, assuming substantially even flow distribution across the surface of the coalescing element, the annular velocity increases linearly from the bottom to the top of the element.

With the cylindrical element design, the annular velocity will be different at all points along the axial length of the element. For example, in separating oil droplets from a gas, the gas will flow upward upon exiting the element, and the liquid droplets will settle downward. At the bottom of the element there would be no flow, so the annular velocity would be zero. At the top of the element, all of the gases would have exited the element and be flowing upward. The annular velocity would be 100% of the flow divided by the cross sectional open area (the area between the element and the vessel wall). Similarly, at a point in the middle of the element the annular velocity would be 50% of the total flow divided by the cross sectional open area. Great care must be taken not to exceed the annular velocity which will cause reentrainment of the droplets.

Furthermore, the pressure drop which results from the gas entering the open end of the element is a function of the inside diameter of the element. The inside diameter of cylindrical elements is limited by the diameter of the housing, the thickness of the wall of the element, and the size of the annular space. It is necessary to maintain sufficiently low annular velocities so as not to reentrain liquid droplets. The smaller the inside diameter is, the higher the pressure drop will be for a given flow rate.

After much study of the problem of how to reduce the annular velocity to prevent reentrainment of the liquid droplets, a substantially conically shaped coalescing filter was devised wherein the open area between the wall of the housing and the filter element increases in the direction of flow. The annular velocity can be expressed as $V_a = Q/A_x$ where Q is the flow and A is the open cross sectional area. It can be seen that if the area between the filter element and the housing increases as the flow increases, the annular velocity may be made to remain constant or, if desired, even to decrease.

Once the idea of a conical coalescing filter was developed, a search of the prior art in the United States Patent and Trademark Office was made to determine if this was new. The only patent located which discloses a conical coalescing element is U.S. Pat. No. 2,823,760 to S. K. Anderson entitled "Water Separator". Other patents were located during the search, but were not relevant. Upon close study of the Anderson "Water Separator", there was found to be a similarity in appearance only. Anderson deals with maintaining a constant pressure. It is not an in to out coalescer, and in fact is a centrifugal coalescer which flows out-to-in and relies on centrifugal force and subsequent steady flow rate to separate the coalesced droplets from the primary phase fluid. Thus even though Anderson thought of making a conically shaped coalescing filter cartridge, he did so for an entirely different purpose, and did not solve the problems in the coalescing filter art which Applicant addresses.

SUMMARY OF THE INVENTION

The present invention solves the problem in the prior art by providing a conical coalescing filter element which may be used in virtually any coalescing filter assembly, depending on the application, to separate liquid drops from gases or other liquids. Such a configuration allows for lower velocities of the primary phase fluid in the area between the outside surface of the coalescing elements and the filter assembly inner wall, thereby preventing reentrainment of the coalesced liquid back into the air stream.

In a preferred embodiment of the present invention, a conical element is disposed in a common T-type filter housing with its smaller end being in communication with the inlet of the filter housing for coalescing oil from, air. The same conical filter element may be used in a multiple element housing wherein the flow enters the bottom, or wide part, of the element. In both embodiments, the flow proceeds from in to out, and the annular velocity between the filter element and the wall of the filter housing will be substantially constant. Depending on the particular application, other configurations may be provided so long as the smallest end of the conical filter is pointed toward the direction of the primary phase flow. The media used in the filter element can be vacuum formed, pleated or wrapped, and the conical coalescing element of the present invention can be used to separate liquids from gas, or one liquid from another liquid.

Thus, it is an object of the present invention to provide a coalescing filter element and coalescing filter assembly which will provide lower annular velocities in the same size vessel than cylindrical elements of similar flow ratings.

It is a further object of the present invention to provide a coalescing filter element and coalescing filter assembly wherein the annular velocity remains substantially constant at all points along the axial length of the element.

It is a further object of the present invention to provide a coalescing element and coalescing filter assembly wherein the annular velocity may decrease as the flow travels from the bottom to the top of the filter element.

A still further object of the present invention is to provide a coalescing element and coalescing filter assembly which will provide lower overall pressure drop through the coalescing filter assembly.

A still further object of the invention is to provide a means for reducing or minimizing the size of the coalescing element and the coalescing filter assembly for a given flow rate and pressure drop.

Further objects and advantages of the present invention will be apparent from the following description and appendix claims, reference being made to the accompanying drawings forming a part of the specification, wherein like reference characters designate corresponding parts in the several views.

BRIEF DESCRIPTION OF THE DRAWINGS

FIG. 1 is a diagrammatic view of a prior art cylindrical coalescing cartridge mounted in a cylindrical filter housing.

FIG. 2 is a diagrammatic view of the conical coalescing filter of the present invention mounted in a cylindrical filter housing.

FIG. 3 is an elevational view, partly in section of a T-type filter housing showing the conical coalescing filter of the present invention between end caps in a cylindrical housing.

Figures 4, 5:
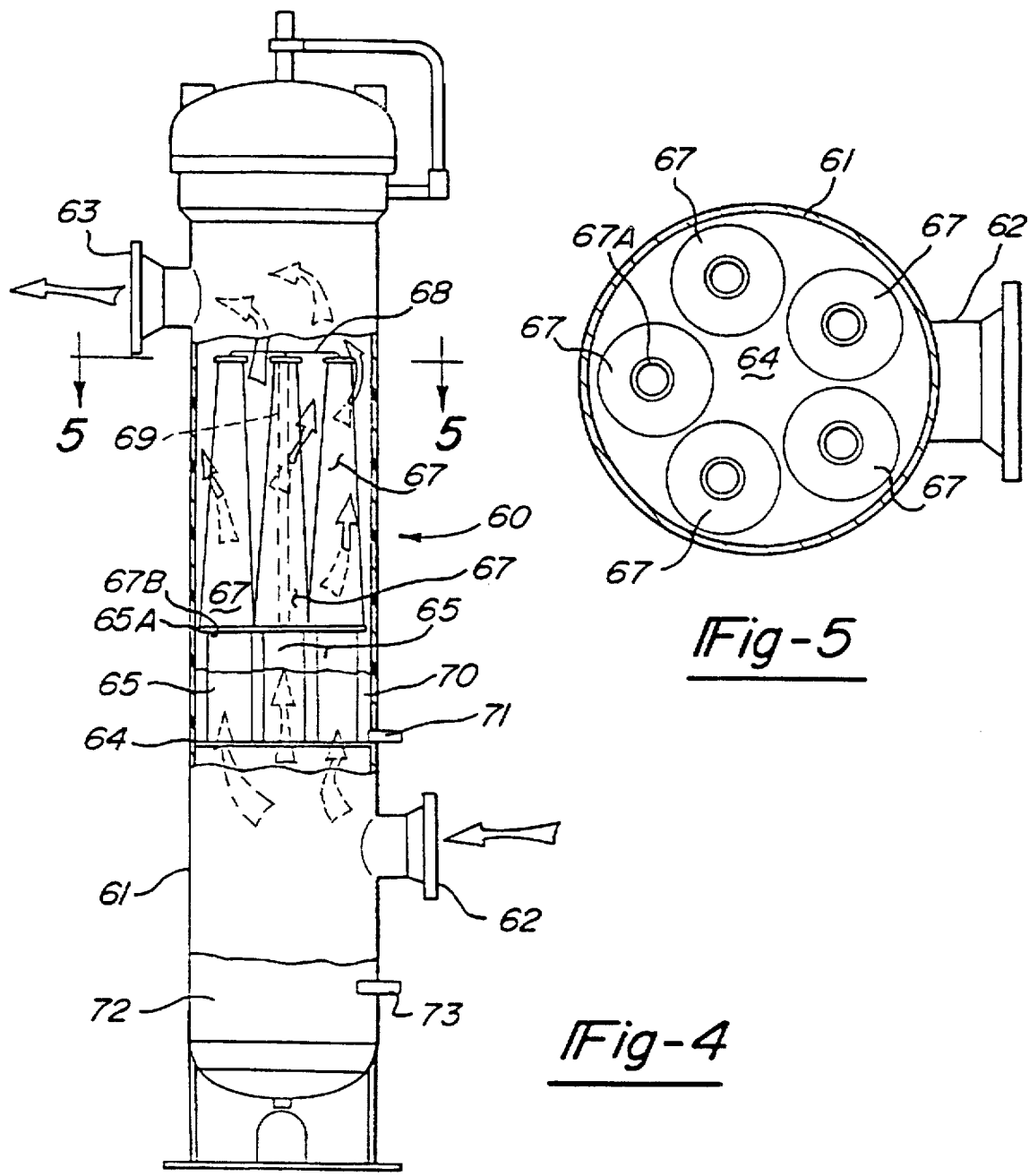
FIG. 4 is an elevational view, partly in section of a multiple element, high efficiency, coalescing filter.
FIG. 5 is a sectional view, taken in the direction of the arrows, along the section line 5—5 of FIG. 4.

It is to be understood that the invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description and not of limitation.

DESCRIPTION OF THE PREFERRED EMBODIMENTS

It is advantageous in designing coalescing filter assemblies to try and maximize the flow rate of the fluids in the assembly, while not reducing separation efficiencies, in order to reduce the size of the housing required for a given flow rate and reduce the manufacturing cost. In doing so there are three important considerations:

1) The face velocity across the filter media.

2) The annular velocity of the continuous phase fluid.

3) The pressure drop across the coalescing filter assembly.

The effect of face velocity upon filter performance will be governed by the fact that as face velocity increases, filter efficiency is reduced In addition, higher face velocities will also cause higher pressure drops across the filter media and element.

As the dispersed droplets are captured by the fibers within the filter media, the rate at which they move toward the downstream surface is a function of the drag force of the continuous phase flowing through the media on the droplets. When the drag force exerted on the droplet exceeds the force of adhesion of the droplet to the fiber, the droplet will become reentrained in the fluid. The drag force is a function of the viscosity and velocity of the continuous phase fluid, and the size of the droplet, while the force of adhesion is a function of the interfacial surface tension between the droplet and the fiber.

Another objective in the design of coalescing filters is to create as large droplets as possible so as to assure they settle (or rise) and are not reentrained in the fluid flow. As the face velocity of the continuous phase liquid increases, the drag force increases. The increased drag force is capable of shearing small droplets from the fibers. After the fluid flows through the coalescing filter element, it flows between the outer surface of the element and the inner wall of the vessel. The rate at which the fluid flows within the annular space between the element and housing wall is called the annular velocity. If the annular velocity of the fluid is greater than the settling velocity of the droplets, the droplet will not settle and will remain entrained in the fluid.

Further, it is advantageous to minimize the pressure drop across the filter assembly. The pressure drop, or pressure loss, is primarily caused by the restriction of the flow through the filter media, and the restriction of the flow through the open end of the element as the fluid enters the inside of the element. The pressure drop through the filter assembly is the sum of the pressure drop through the housing and the coalescing element. The pressure drop through the element is dependent upon the permeability of the media and the surface area. The pressure drop through the housing is largely caused by the restriction of the inlet and outlet connections and the opening or restriction to the inside of the element. In designing the conical coalescing filter element of the present invention, the filter designer will need to take the above facts into consideration.

The annular velocity may be expressed as $V_a = Q/A_x$, where Q is the flow rate and A is the annular area between the filter element and the wall of the filter assembly. It should be understood that this is an approximate formula. Designing a filter element wherein the velocity was exactly constant along the linear length of the filter would result in a filter having of slightly parabolic shape. While this is well within the scope of the present invention, it is not the preferred embodiment.

After the designer has decided all of the above parameters, the conical coalescing filter elements of the present invention may be manufactured in similar ways as the coalescing filters of the prior art. Such coalescing filters may have one or more support cores, support layers, end caps and elastomeric seals. The media may be manufactured into an seamless tube of non-woven fibers by applying a vacuum to the inside of a porous mandrel and submersing the mandrel in a slurry of fibers of various compositions as seen in U.S. Pat. No. 4,836,931 to Spearman and U.S. Pat. No. 4,052,316 to Berger.

It is also possible that the conical filter may be manufactured from non-woven media in a flat sheet form and rolled several times around a center core like devices seen in U.S. Pat. No. 3,802,160 to Foltz, U.S. Pat. No. 4,157,968 to Kronsbein, or U.S. Pat. No. 3,708,965 to Dominik.

The non-woven media may be manufactured in flat sheet form and rolled several times around a cylindrical mandrel, impregnated with a resin binder to offer rigidity, and the mandrel removed as seen in U.S. Pat. Nos. 4,006,054, and 4,102,785 to Head and U.S. Pat. No. 4,376,675 to Perotta.

The filter media may also be pleated. Pleating is well known in the art.

Advantages of the conical coalescing element can be best illustrated by comparing it to other conventional cylindrical coalescing elements. The following examples compare cylindrical elements of two sizes (2.75" OD×30" L and 6" OD×36" L) with conical coalescing elements which fit in a filter vessel with the same inside diameter with the respective cylindrical element. In both examples, the fluid used is natural gas at 1,000 psig and 60° F.

EXAMPLE 1

In a given filter vessel diameter, the improved conical coalescing filter element provides lower annular velocities and lower pressure drops than conventional cylindrical elements. In Example 1, conical elements are compared with cylindrical elements at the same flow rates through the comparative elements. The conical element dimensions have been selected to provide approximately the same surface area as the comparable cylindrical element so that the pressure drop through the filter media is the same and, therefore, the effect on the annular velocity and pressure drop through the open (base) end cap opening by the conical element configuration is shown:

|  | Conventional | Conical | Conventional | Conical |
| --- | --- | --- | --- | --- |
| OD(top) | 2.75" | 1.5" | 6" | 4" |
| OD(base) | 2.75" | 4" | 6" | 8" |
| Length | 30" | 30" | 36" | 36" |
| ID(base) | 1.75" | 3" | 4" | 6" |
| Vessel ID | 4" | 4" | 8" | 8" |
| Surface Area | 1.80 ft² | 1.80 ft² | 4.71 ft² | 4.72 ft² |
| Flow (ACFM) | 27.6 | 27.6 | 91.5 | 91.5 |
| Face Vel. (fpm) | 15.3 | 15.3 | 19.4 | 19.4 |
| Annular Vel (fps) | 10 | 6.13 | 10 | 5.83 |
| Base IDΔP (psid) | 0.24 | 0.03 | 0.1 | 0.02 |

In both cases, the conical element provides lower annular velocities than the cylindrical element (6.13 vs. 10 and 5.83 vs. 10) at the same flow rate and face velocity. In addition, the pressure drop through the end cap (Base ID) is substantially lower (0.03 vs. 0.24 and 0.02 vs. 0.10).

EXAMPLE 2

A benefit of the improved conical coalescing filter element design is the ability to flow more gas in a given diameter filter vessel. In Example 2, the length of the conical element has been increased to provide increased surface area compared to the referenced cylindrical element in order to flow more gas through the media at the same pressure drop (related to face velocity) and annular velocity in the vessel.

|  | Conventional | Conical | Conventional | Conical |
| --- | --- | --- | --- | --- |
| OD(top) | 2.75" | 1.5" | 6" | 4" |
| OD(base) | 2.75" | 4" | 6" | 8" |
| Length | 30" | 49" | 36" | 62" |
| ID(base) | 1.75" | 3" | 4" | 6" |
| Vessel ID | 4" | 4" | 8" | 8" |
| Surface Area | 1.80 ft² | 2.93 ft² | 4.71 ft² | 8.08 ft² |
| Flow(ACFM) | 27.6 | 45 | 91.5 | 157 |
| Face Vel.(fpm) | 15.3 | 15.3 | 19.4 | 19.4 |
| Annular Vel (fps) | 10 | 10 | 10 | 10 |
| Base IDΔP | 0.24 | 0.08 | 0.1 | 0.06 |

In both cases, the conical element provides higher flow rates than the cylindrical element at the same annular velocity (45 vs. 27.6 and 157 vs. 91.5). In addition, the pressure drop through the end (Base ID) is substantially lower (0.08 psid vs. 0.24 psid and 0.06 psid vs. 0.1 psid).

Referring now to FIG. 1, there is shown a diagrammatic view of a typical prior art filter construction wherein a hollow cylindrical filter element 20 is displaced within a cylindrical housing 21. The fluid or gas to be filtered is introduced at the inlet 22 and proceeds from the interior of the filter 20 to the exterior thereof and travels between filter element 20 and the cylindrical housing 21 until it exits the filter housing. Since the annular velocity $V_a$ can be expressed as the quotient of the flow Q divided by the area A between the filter element 20 and the filter housing 21, it can be seen that as the flow increases from 0% at the bottom of the filter element 20, to 100% at the top of the filter element, with the area constant, the velocity must be increasing. As discussed above, if the velocity becomes too great, the coalesced liquid droplets, which are normally travelling toward the bottom of the filter element 20, will be reentrained in the air stream, and the efficiency will be reduced.

In contrast, FIG. 2 shows a diagrammatic view of the conical coalescing element 25 of the present invention mounted in the same filter housing 21. Again, air enters through the inlet 22 and travels upwardly. This time, because the area between the filter element 25 and filter housing 21 is increasing, by proper filter design the annular velocity can be held constant, substantially constant, or be made to decrease, depending on the particular parameters chosen by the filter designer.

Referring now to FIG. 3, there is shown a typical T-type filter assembly 30. The filter assembly has what is known in the art as a T-shaped head 35 having an inlet 36 including a central opening 37. The filter head also has an outlet 38 communicating with annular space 39. Together the inlet 36 and the outlet 38 comprise means for introducing the fluid to be filtered to the interior of the filter assembly. A threaded portion 40 is provided on the lower end of the head 35, to which a retaining ring 41 may be threadably attached. Held by the retaining ring 41 is a filter bowl 42 having a rim 43 which is pressed against an 0-ring 45 mounted in a suitable groove 46 in the head 35. It can be seen that the combination of the head 35, the retaining ring 41 and the 0-ring define a sealed interior space 46. The inlet 36 and the outlet 38 sealingly communicate with the interior space 46.

A filter retaining means 47 is provided centrally of the filter head 35 and is contained within the sealed interior space 46.

A conical filter element 50 having a lower end 50A and an upper end 50B, is sealingly mounted between end cap 51 which is threadably attached to retaining means 47, and the annular sealing surface 48 provided about the central opening 37. In this embodiment of the invention, the annular sealing surface 48 is provided integrally with the filter head 35, and replaces an upper end cap sometimes found in T-type filter housings.

In this manner, the conical filter element 50 has its ends 50A and 50B substantially closed between a pair of closure members, in this case annular sealing surface 48 and end cap 51, and is mounted inside a suitable filter housing having inlet means sealingly communicating with the interior of said filter, and outlet means communicating with the atmosphere.

Referring now to FIGS. 4 and 5, there is shown a high efficiency, multiple element, coalescing filter such as that manufactured by Applicant's assignee, but modified to accept the conical coalescing filter element of the present invention. In this embodiment, the multi-element filter assembly 60 has a filter housing 61 having an inlet 62 and an outlet 63. Interposed between the inlet 62 and outlet 63 is a tube sheet 64 having a plurality of openings therein communicating with risers 65 having integral end cap portions 65A thereon, to which are mounted a plurality of elongated conical filter elements 67. Depending upon the design considerations as hereinbefore discussed, the elongated conical filter elements 67 may be true cones having a rounded apex (not shown), or they may be as shown having upper and lower sealing surfaces (67A, 67B) and sealed between the sealing surfaces 65A of the risers and the end cap assembly 68 held in place by the retaining rod 69.

Large contaminants and liquid slugs entering through the inlet 62 collect in a lower sump 72 and are drained through the lower drain 73. The remaining liquid aerosols are coalesced away from the gas stream and drained into the upper sump 70 away from the flow of the gas stream by the coalescing elements 67. The upper sump is drained as needed through the upper drain 71.

Thus, by carefully studying the problems present with conventional coalescing filter elements, I have developed a novel conical coalescing filter element and various filter assemblies which can be used in conventional filter assemblies for improved performance.

I claim:

1. A filter assembly including:
   a) a conical porous filter element formed of randomly oriented glass fibers and having an upper flat annular flat sealing surface and a lower annular flat sealing surface, and
   b) means for introducing the fluid to be filtered to the interior of said filter in such a manner that such fluid will flow through the conical filter element, from in to out, wherein said filter element has its ends substantially closed by a pair of closure members, and is mounted inside a suitable filter housing having inlet means sealingly communicating with the interior of said filter.

2. A filter assembly comprising a conical coalescing filter element consisting essentially of a non-woven coalescing media of conical shape, wherein coalescing takes place within the media as fluid flows from the inside to the outside of the media, and including means for introducing the fluid to be filtered to the interior of said conical coalescing filter element in such a manner that such fluid will flow through the filter from inside to outside, and wherein said conical coalescing filter element has its ends substantially closed by a pair of closure members, and mounted inside a suitable filter housing having inlet means sealingly communicating with the interior of said filter, and outlet means communicating with a fluid stream.

3. A porous coalescing filter element consisting essentially of a non-woven coalescing media of conical shape, wherein said coalescing media has at least a lower end having an annular sealing surface thereon, and wherein coalescing takes place essentially completely within the coalescing media as fluid flows from the inside to the outside of the coalescing media.

4. The porous filter element described in claim 3, wherein said filter element is manufactured from a filter media originally in a flat sheet form.

5. The porous filter element described in claim 4, wherein said filter media is pleated during the manufacturing process.

6. The coalescing filter element described in claim 3, wherein the filter media is made of randomly oriented fibers.

7. The coalescing filter element described in claim 3, wherein the element is made from borosilicate glass.

8. The coalescing filter element described in claim 3, wherein the element is made from polypropylene.

9. The coalescing filter element described in claim 3, wherein the element is made from polyethylene.

10. The coalescing filter element described in claim 3, wherein the element is made from polyester.

11. The coalescing filter element described in claim 3, wherein the element is made from nylon.

12. The coalescing filter element described in claim 3, wherein the element is made from polytetrafluroethylene.

13. The coalescing filter element described in claim 3, wherein the element is made from ceramic.

14. The coalescing filter element described in claim 3, wherein the element is made from cellulose.

15. The coalescing filter element described in claim 3, wherein the element is made from steel.

16. The coalescing filter element described in claim 3, wherein the element is made from stainless steel.

17. The coalescing filter element described in claim 3, wherein the element is made from Inconel metal alloy consisting of nickel, iron and chromium.

18. The coalescing filter element described in claim 3, wherein the element is made from Monel metal alloy consisting of nickel, cooper, manganese and iron.

19. The coalescing filter element described in claim 3, wherein the element is made from copper.

20. A porous coalescing filter element consisting essentially of a non-woven coalescing media of conical shape, said coalescing filter media having at least one end with said end having an annular sealing surface thereon, wherein coalescing takes places within the coalescing media as fluid flows from the inside to the outside of the media, said filter element further including at least one layer of a suitable thin sheet material wrapped around said conical porous filter media and being in intimate contact therewith.

21. A porous coalescing filter element consisting essentially of a non-woven coalescing media of conical shape, said non-woven coalescing media having at least one end with said end having an annular sealing surface thereon, wherein coalescing takes places within the coalescing media as fluid flows from the inside to the outside of the media, said filter element further including at least one layer of a suitable porous sheet material wrapped around said conical non-woven filter media and being in intimate contact therewith, said porous sheet material having larger pores than the filter media.

22. A porous coalescing filter element consisting essentially of a non-woven coalescing media of conical shape, said non-woven coalescing media having at least one end, said end having an annular sealing surface thereon, wherein coalescing takes place within the filter media as fluid flows from the inside to the outside of the media, and including an outer support structure of sufficient rigidity to radially support said porous filter media.

23. A porous coalescing filter element consisting essentially of a non-woven coalescing media of conical shape, said non-woven coalescing media having an upper and a lower end, each of said upper and said lower ends having an annular sealing surface thereon, wherein coalescing takes place within the filter media as fluid flows from the inside to the outside of the media, and including an outer support structure of sufficient rigidity to radially support said porous filter element.

24. A coalescing filter assembly comprising a conical coalescing filter element as described in any one of claims 11, 12, or 28–31, and including means for introducing the fluid to be filtered to the interior of said filter element in such a manner that such fluid will flow through said filter from inside to outside, and wherein said conical coalescing element has its ends substantially closed by a pair of closure members, and mounted inside a suitable filter housing having inlet means sealingly communicating with the interior of said filter element and outlet means communicating with the local atmosphere.

25. A coalescing filter element including, in combination:
a) an inner support structure of a conical configuration,
b) an inner layer of suitable sheet material wrapped around said inner support structure,
c) a porous coalescing filter element formed of randomly orientated fibers and being of conical shape,
d) at least one outer layer of a suitable thin sheet material wrapped about said filter element and being in intimate contact wherewith,
e) an outer support structure of conical configuration and being of sufficient rigidity to radially support said porous filter element and said suitable thin sheet material and having an inside diameter substantially the same as the outside diameter of the combination of said inner conical support structure, said inner layer of said suitable sheet material, said porous filter element, and said outer layer of suitable sheet material and completely surrounding said combination.

26. A coalescing filter assembly including:
a) a conical porous filter element having an upper annular sealing surface and a lower annular sealing surface, and
b) means for introducing the fluid to be filtered to the interior of said filter in such a manner that such fluid will flow through the conical coalescing filter element from in-to-out, wherein said filter element has its ends substantially closed by a pair of closure members, and is mounted inside a suitable filter housing having inlet means sealingly communicating with the interior of said filter, and outlet means communicating with local atmosphere or inside chamber of said filter.

27. A multiple element coalescing filter assembly including, in combination:
a) a filter housing having an inlet and an outlet,
b) a tube sheet, having a plurality of openings interposed between said inlet and outlet,
c) a plurality of elongated conical filtering elements mounted to said openings, and
d) having inlet means sealingly communicating with the interior of said filter elements and outlet means communicating with the local atmosphere.

28. A coalescing filter element consisting essentially of, in combination:
(a) a porous coalescing filter media formed of randomly orientated fibers and being of conical shape, said porous coalescing filter media having at least one end, said at least one end having an annular sealing surface, and
(b) at least one outer layer of a suitable thin sheet material wrapped about said filter media and being in intimate contact therewith.

29. A coalescing filter element consisting of:
a) a porous coalescing filter media formed of randomly orientated fibers and being of conical shape, said filter media having at least one end portion, said at least one portion having an annular sealing surface thereon, said media being chosen such that coalescing takes places substantially within the filter media as fluid flows from the inside to the outside of the media,
b) at least one outer layer of a suitable thin sheet material wrapped about said filter media and being in intimate contact therewith,
c) an outer support structure of conical configuration and being of sufficient rigidity to radially support said filter media and said suitable thin sheet material and having an inside diameter slightly smaller than the outside diameter of the combination of said porous filter media and said outer layer of suitable sheet material and completely surrounding said combination.

30. A coalescing filter element consisting of:
a) an inner support structure of a conical configuration,
b) an inner layer of suitable sheet material wrapped around said inner support structure,
c) a porous coalescing filter media formed of randomly orientated fibers and being of conical shape, said filter media having at least one end portion, said end portion having an annular sealing surface thereon, said filter media being chosen such that coalescing takes place substantially within the media as fluid flows from the inside to the outside of the media,
d) at least one outer layer of a suitable thin sheet material wrapped about said filter media and being in intimate contact therewith, and e) an outer support structure of conical configuration and being of sufficient rigidity to radially support said porous filter media and said suitable thin sheet material and having an inside diameter slightly smaller than the outside diameter of the combination of said inter conical support structure, said inner layer of said suitable sheet material, said porous filter media, and said outer layer of suitable sheet material and completely surrounding said combination.

31. A porous coalescing filter element consisting essentially of a non-woven coalescing media of conical shape, said non-woven coalescing media having at least one end portion, said at least one end portion having an annular sealing surface thereon, said porous conical filter element separating liquid droplets disbursed in a gas stream from the gas stream by means of flowing the liquid and gas mixture in a direction from the inside to the outside of the porous coalescing filter element said coalescing media being chosen such that said coalescing takes place substantially within the filter media as the fluid flows from the inside to the outside of the filter media.

32. A porous coalescing filter element of conical shape which separates liquid droplets dispersed in a gas stream from the gas stream by means of flowing the liquid/gas mixture in a direction from the inside to the outside of the porous coalescing filter element, and allowing the liquid droplets to come in contact with the filter media in the porous coalescing filter element, causing the droplets to coalesce with other droplets which have also come in contact with the filter media to form larger droplets which eventually emerge on the outside of the element to be separated from the gas, said porous coalescing filter element consisting essentially of a non-woven coalescing media of conical shape, said coalescing media having at least one end portion, said end portion having an annular sealing surface thereon, the media being chosen such that coalescing takes place substantially within the media as fluid flows from the inside to the outside of the media.

33. A porous coalescing filter element consisting of a non-woven coalescing media of conical shape, said non-woven coalescing media of conical shape having at least one end portion, said end portion having an annular sealing surface thereon, said media being chosen such that coalescing takes place within the media as fluid flows from the inside to the outside of the media, which separates liquid droplets of a first liquid dispersed in a second liquid stream from the second liquid stream by means of flowing the mixture of the first liquid and the second liquid in a direction from the inside to the outside of the porous coalescing filter element.

34. A porous coalescing filter element consisting of a non-woven coalescing media of conical shape, said non-woven coalescing media of conical shape having at least one end portion, said end portion having an annular sealing surface thereon, said media being chosen such that coalescing takes place substantially within the media as the fluid flows from the inside to the outside of the media, which separates liquid droplets of a first liquid dispersed in a second liquid stream from the second liquid stream by means of flowing the mixture of the first liquid and the second liquid stream in a direction of inside to outside of the element, and allowing the liquid droplets to come into contact with the filter media in the element causing the droplets to coalesce with the other droplets which have also come in contact with the filter media to form larger droplets which eventually emerge on the outside of the element to be separated from the second liquid stream.

35. The coalescing filter element defined in claim 34, in which the media is formed of glass fibers.

36. A porous coalescing filter element of conical shape which separates liquid droplets dispersed in a fluid stream from the fluid stream by means of flowing the mixture of the liquid droplets and the fluid stream in a direction from the inside to outside of the filter element, said filter element having a conical shape and consisting essentially of a non-woven coalescing media of conical shape, said coalescing media having at least one end portion, said end portion having an annular sealing surface thereon, the media being chosen such that coalescing takes place substantially within the media as fluid flows from the inside to the outside of the media, said filter element, when used in combination with a cylindrical filter housing, allows the annular velocity of the fluid at any point on the outside surface of the media of the filter element to be not more than 50% of the annular velocity at any other point on the outside of the filter media.

37. The coalescing filter element defined in claim 36, in which the difference in the annular velocity of the fluid on the outside surface of the media of the element between any two points is less than 25%.

38. The coalescing filter element defined in claim 36, in which the difference in the annular velocity of the fluid on the outside surface of the media of the element between any two points is less than 10%.

39. The coalescing filter element defined in claim 36, in which the difference in the annular velocity of the fluid on the outside surface of the media of the coalescing filter element between any two points is less than 5%.

40. The coalescing filter element defined in claim 36, in which the difference in the annular velocity of the fluid on the outside surface of the media of the element between any two points is less than 1%.

41. A porous coalescing filter element which separates liquid droplets dispersed in a fluid stream from the fluid stream by means of flowing the mixture of the liquid droplets and the fluid stream in a direction from the inside to the outside of the coalescing filter element, said element having a filter media of a conical shape which, when used in combination with a cylindrical filter housing, allows the annular velocity of the fluid on the outside surface of the media of the element to be substantially constant at all points along the axial length of the element.

42. A porous coalescing filter element consisting of a coalescing media of conical shape which separates liquid droplets dispersed in a fluid stream from the fluid stream by means of flowing the mixture of the liquid droplets and the fluid stream in a direction from inside to outside of said conically shaped media, wherein coalescing takes places within the media and which, when used in combination with a cylindrical filter housing, allows the annular velocity of the fluid on the outside surface of the media of the element to decrease in the direction of the fluid steam.

43. A porous coalescing filter element consisting of a coalescing media of a conical shape which separates a discontinuous phase fluid dispersed in a continuous phase fluid by means of flowing the fluid mixture in a direction from the inside to the outside of the coalescing filter media.

44. A porous coalescing filter element consisting of a coalescing media of conical shape which separates a discontinuous phase fluid dispersed in a continuous phase fluid by means of flowing the fluid mixture in a direction from the inside to the outside of the coalescing filter element, and allowing the discontinuous phase to come into contact with the filter media and the element, causing the discontinuous phase to coalesce while within the media to form larger droplets which eventually emerge on the outside of the media to be separated from the continuous phase.

45. The coalescing filter element defined in claim 44, in which the media is made of glass fibers.

46. A porous coalescing filter element consisting of a coalescing media of conical shape which separates gas bubbles dispersed in a liquid stream from the liquid stream by means of flowing the mixture of the first liquid stream and the second liquid stream in a direction from the inside to the outside of the media, wherein coalescing takes place within the media as fluid flows from the inside to the outside of the media.

47. A porous coalescing filter element consisting of a coalescing media of conical shape which separates gas bubbles dispersed in a first liquid stream from a second liquid by means of flowing the gas liquid mixture through the filter media in a direction from the inside to the outside of the element, and allowing the gas bubbles while within the media to come in contact with the filter media in the element causing the bubbles to coalesce with other gas bubbles which have also come in contact with the filter media to form larger gas bubbles which eventually emerge on the outside of the element and are thus separated from the second liquid.

48. The coalescing filter element defined in claim 47, in which the media is formed of glass fibers.

49. A coalescing filter element for use in a filter assembly having an inlet means sealingly communicating with the interior of the filter element such that the fluid will flow from the inside to the outside of the filter element, and the area between the filter element and the wall of the housing increases in the direction of primary phase fluid flow, said filter element having a substantially conical or frustraconical porous body formed of randomly oriented fibers and being adapted to sealingly communicate its interior with said inlet means of said filter assembly such that in use fluid will flow from the inside to the outside of the filter element, wherein said coalescing filter element consists essentially of said porous body formed of a coalescing media of conical or frustraconical shape, said coalescing media having at least one end portion, said end portion having an annular sealing surface, said media being chosen so that coalescing takes place substantially within the media as fluid flows from the inside to the outside of the media.

50. A substantially conical coalescing filter element wherein the filter element has a substantially conical porous body comprising a filter media made of randomly oriented fibers or from borosilicate glass, polypropylene, polyethylene, polyester, nylon, polytetrafloroethylene, ceramic, cellulose, steel, stainless steel, inconel, monel or copper, wherein the filter element has a sealing surface on one end or both ends, and wherein the filter element further includes at least one layer of a suitable thin sheet material wrapped around said porous body in intimate contact therewith, and wherein the filter element further includes an outer support structure of sufficient rigidity to radially support said porous body and said suitable sheet material, said outer support structure completely surrounding the combination of the porous body in said outer layer of sheet material and having an inside diameter substantially the same or slightly smaller than the outside diameter of the combination prior to assembly therewith.

51. A porous coalescing filter element consisting essentially of a high efficiency non-woven coalescing media of conical shape, wherein said high efficiency coalescing media has at least a lower end having an annular sealing surface thereon, and wherein coalescing takes place as fluid flows from the inside to the outside of the coalescing media.

52. A porous coalescing filter element consisting essentially of a formed, non-woven coalescing media of conical shape, wherein said formed coalescing media has a lower end having an annular sealing surface thereon, and wherein coalescing takes place substantially within the wrapped coalescing media as fluid flows from the inside to the outside of the wrapped coalescing media.

53. A porous coalescing filter element consisting essentially of a wrapped non-woven coalescing media of conical shape, wherein said wrapped non-woven coalescing media has a lower end having an annular sealing surface thereon, and wherein coalescing takes place substantially within the wrapped coalescing media as fluid flows from the inside to the outside of the wrapped coalescing media.

54. A porous coalescing filter element consisting essentially of a non-woven coalescing media of conical shape, wherein said coalescing media has at least a lower end having an annular sealing surface thereon, an end cap in sealing communication with said at least a lower end annular sealing surface, and wherein coalescing takes place essentially completely within the coalescing media as fluid flows from the inside to the outside of the coalescing media.

55. A porous coalescing filter element consisting essentially of a non-woven coalescing media of conical shape, said coalescing filter media having at least one end, with said end having an annular sealing surface thereon, and an end cap in sealing communication with said annular sealing surface, wherein coalescing takes places within the coalescing media as fluid flows from the inside to the outside of the media, said filter element further including at least one layer of a suitable thin sheet material wrapped around said conical porous filter media and being in intimate contact therewith.

* * * * *